(No Model.)
W. H. BARWICK.
RAILWAY SWITCH.
No. 396,679. Patented Jan. 22, 1889.
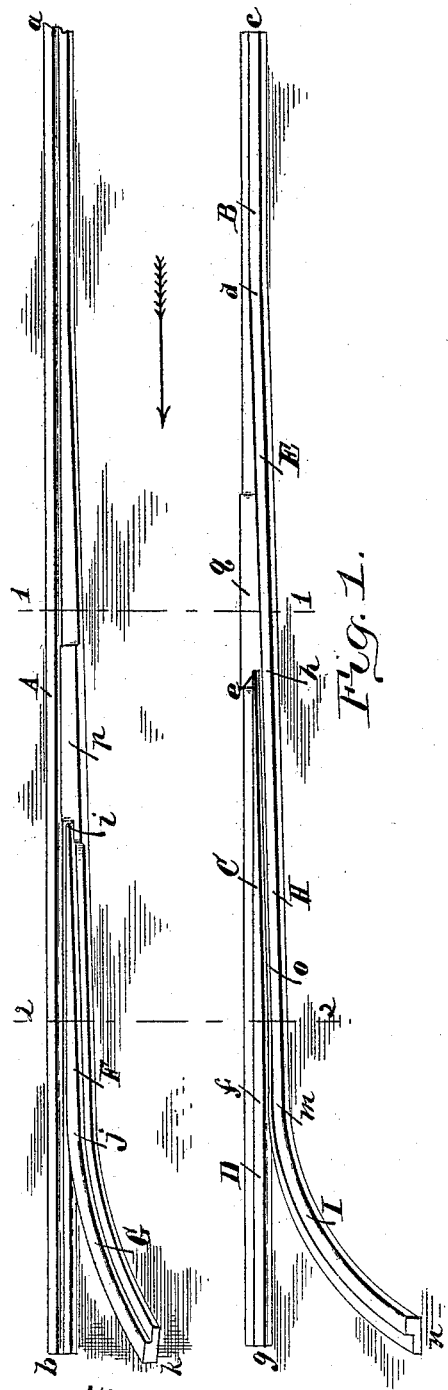
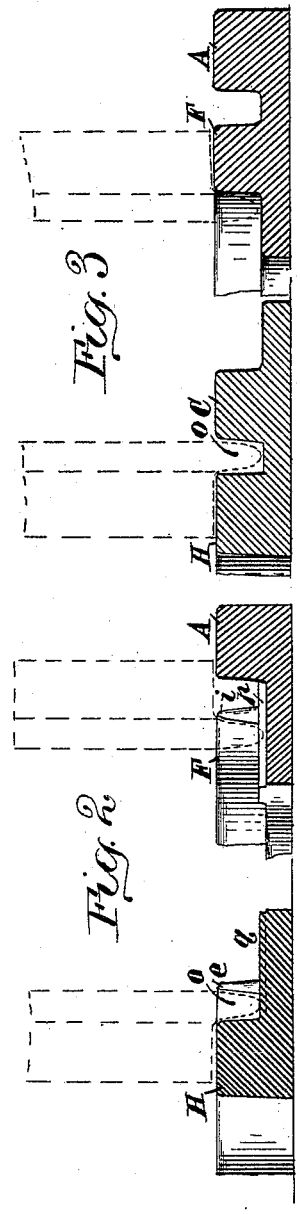
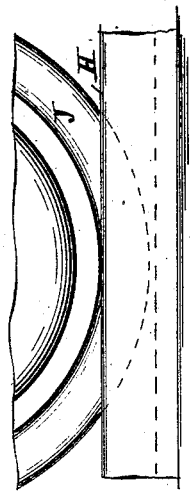
Witnesses.
Fred J. Hutchinson,
Edw. Dummer.
Inventor,
William H. Barwick.

UNITED STATES PATENT OFFICE.

WILLIAM H. BARWICK, OF EVERETT, ASSIGNOR TO HIMSELF, COLBEE O. BENTON, OF CAMBRIDGE, AND FRED J. HUTCHINSON, OF BOSTON, MASSACHUSETTS.

RAILWAY-SWITCH.

SPECIFICATION forming part of Letters Patent No. 396,679, dated January 22, 1889.

Application filed October 13, 1888. Serial No. 288,039. (No model.)

*To all whom it may concern:*

Be it known that I, WILLIAM H. BARWICK, a subject of the Queen of Great Britain, residing at Everett, in the county of Middlesex and State of Massachusetts, have invented a new and useful Improvement in Railway-Switches, of which the following is a specification, reference being had to the accompanying drawings.

My invention relates to that class of railway-switches especially adapted for street-railways, and in which there are no movable switch-rails, but which are so constructed that a car is directed from one track onto another by a side draft—as, for instance, by means of the horses employed for hauling the car—the object of the invention being to so construct said switches that the switching of a car will be made more certain than heretofore, and to otherwise improve the same.

My invention consists in the construction of tracks and switching-rails, as hereinafter described, and specifically pointed out in the claims.

In the drawings, Figure 1 is a perspective view of so much of a switch of a street-railway embodying my invention as is sufficient for illustration of the same. Fig. 2 shows a transverse section of rails on line 1 1, and Fig. 3 a transverse section of rails on line 2 2 in Fig. 1. Fig. 4 is a side view of a part of a rail and of a part of a car-wheel thereon. Figs. 2, 3, and 4 are drawn on a larger scale than Fig. 1.

In Fig. 1 are shown rails of parts of two tracks, one a straight or the main track, and the other the turn-out or a track which curves from the former. These parts may be described and subdivided as follows: On the main track the tread A of the rails on one side may be continuous through the length of the track, as from $a$ to $b$. The parts of the treads of the rails which are exclusively for the main track on the other side may be represented by the part B, extending from $c$ to $d$, the part C extending from $e$ to $f$, and the part D extending from $f$ to $g$. That tread E which may be regarded as for both the main and the turn-out track extends from $d$ to $h$. Part of the tread of the turn-out on one side is at F, extending from $i$ to $j$, and the remainder at G, extending from $j$ to $k$. Part H of the tread on the other side of the turn-out extends from $h$ to $m$, the remainder, I, extending from $m$ to $n$. The tread A may be throughout its length of the full width. The tread B and tread D are of the full width and parallel to tread A. The tread G and tread I are parallel to each other, and may be of the full width. Each of the tread H and the tread E is equal or greater in length than the distance between the two truck-wheels on one side of a car. The tread H and tread E are in one continuous line, which departs from a parallel with tread A just sufficiently to make the space $o$ between the tread C and the tread H a very little wider than the thickness of the flange of a car-wheel. The inner line of the tread F is parallel with the tread H, and therefore the tread F is tapering and comes to a point at $i$, as shown. The inner line of the tread C is parallel with the tread A, and therefore is tapering and comes to a point at $e$. At $p$ and $q$ are raised portions of the flanges of the corresponding rails, so that the flanges of the car-wheels may ride thereon and the wheels slide sidewise on the track.

The tracks and rails being constructed as above described, if a car drawn by horses and moving in the direction of the arrow shown is to continue on the main track the horses are guided slightly to the right hand, so as to cause the tread of each of the right-hand wheels to run continuously on the tread A and the tread of each of the left-hand wheels to run on the tread B onto and diagonally on the tread E until the wheel passes from the tread E. The flange of each left-hand wheel will then run on the raised flange $q$ till the tread of the wheel enters on the tread C. Thereafter the wheels will run on the tread A and the tread D of the main track the distance required. If the car is to pass onto the other track or turn-out, when the left-hand forward wheel has entered on the tread E the horses are guided toward the left, so that the left-hand wheels will run on the tread E and H and the right-hand wheels will run diagonally on the tread A till they pass off from this tread, so that the flange of each of these wheels rides on the raised flange *p* until the wheel passes onto the tread F. From the tread F and tread C the wheels run onto the tread G and tread I, which may be curved as desired and continue for the distance required. Broken lines in Figs. 2 and 3 indicate the position of the wheels at the places of section.

It will be seen that the passage of all the wheels of the car-truck—forward as well as rear wheels—to follow the main track or enter on the turn-out is easy. In passing onto the turn-out the car is readily and surely directed, since the tread E and H departs so little from a parallel with the tread A. There is but slight departure of the turn-out from the main track until the flange of the right-hand forward wheel is on the inner side of the tread F and the flanges of both left-hand wheels are outside of the tread C. Furthermore, as the result of an important feature of my invention, after the forward part of the car-truck has been swung to pass onto the turn-out and the flange of the forward left-hand wheel entered between the tread C and the tread H, the rear of the car-truck cannot continue on or be swung back onto the main track, since the flange of this wheel nearly or quite fills said space, as illustrated in Fig. 2. This wheel cannot be twisted or swung around while the flange is in said space, since the rail on either side extends some distance along the flange of the wheel J, as illustrated by Fig. 4. If the wheel cannot be twisted or swung around, the car-truck or car cannot be so twisted or swung, but must move in a direction parallel with the tread H.

I claim as my invention—

1. In a railway-switch, the combination of fixed rails of one track providing the tread A, and tread B, and tread C with fixed rails for a branch track, providing the tread E H, and the tread F, the tread B and tread C being parallel with tread A, the tread H being parallel with the tread F, and the tread E H being in one continuous line and extending each way beyond the end or point *e* of the tread C a distance equal to or about equal to the distance between the two wheels on one side of a car-truck, substantially as and for the purpose set forth.

2. The combination of fixed rails providing the tread A, tread B and tread C parallel with tread A, tread E and tread H about equal in length to each other, and tread F parallel with tread H, the distance between the tread H of the turn-out and the tread C of the main track being about equal to the thickness of the flange of a car-wheel, substantially as and for the purpose set forth.

3. The combination of fixed rails forming a railway-switch and providing a tread, A, on one side of the main track, a tread, B, and tread C on the other side of the main track, a tread, F, on one side of the turn-out, a tread, H, on the other side of the turn-out, opposite to and parallel with the tread F, a tread, E, between the tread B and tread C and forming part of each track, and the raised flanges *p* and *q*, the tread E and tread H forming a continuous line and equal in length to twice the distance between the two wheels on one side of a car-truck, substantially as described.

WILLIAM H. BARWICK.

Witnesses:
FRED J. HUTCHINSON,
EDW. DUMMER.